March 5, 1935. C. G. REETZ 1,993,682
HANDLE FOR STORAGE BATTERIES
Filed July 10, 1933
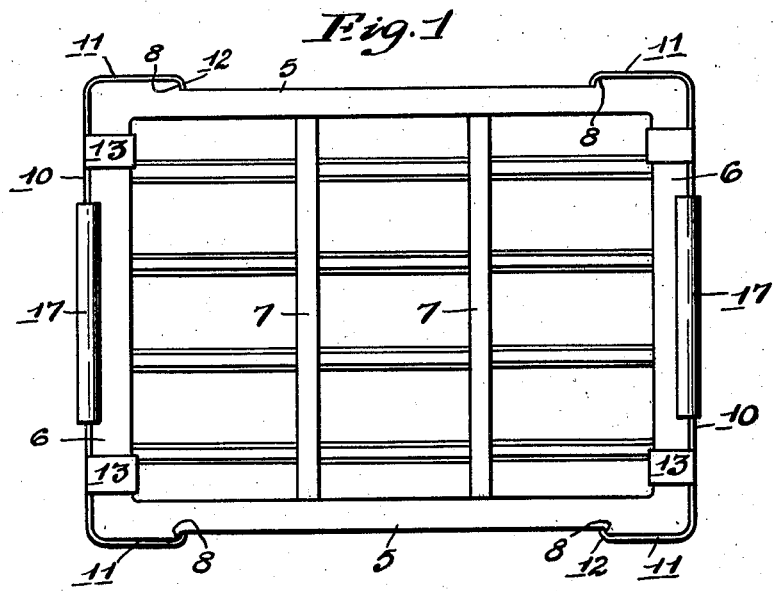
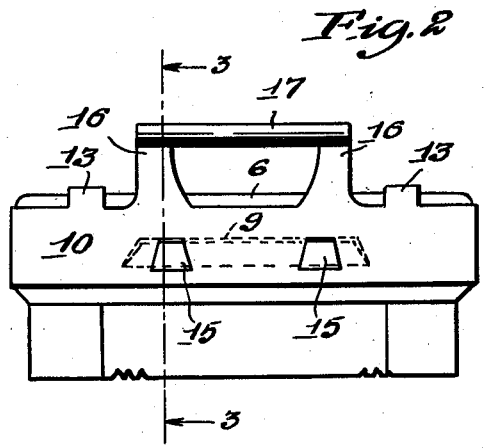
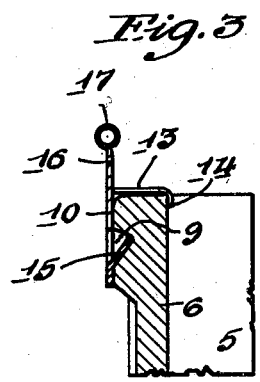
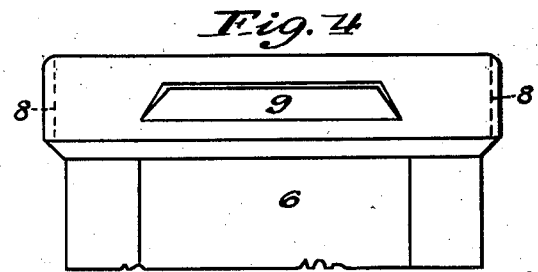
Inventor
Carl G. Reetz
By Stryker & Stryker
Attorneys Patented Mar. 5, 1935

1,993,682

UNITED STATES PATENT OFFICE 1,993,682

HANDLE FOR STORAGE BATTERIES

Carl G. Reetz, St. Paul, Minn., assignor to National Battery Company, a corporation of Delaware Application July 10, 1933, Serial No. 679,671

2 Claims. (Cl. 16—114)

It is an object of this invention to provide for storage batteries having recessed, non-projecting handles, separate sets of novel and inexpensive handles arranged to be quickly and easily applied to the battery containers to adapt the batteries for such installations as in motor vehicles where projecting handles and hold-down devices for engaging such handles are required.

A particular object is to provide, in combination with a battery container having molded recesses or hand holes, a pair of auxiliary, projecting handles adapted to be quickly and easily applied to the container for a specific type of installation and to facilitate carrying the battery, the auxiliary handles having unusual strength by reason of a novel arrangement of members embracing the outer, opposite, vertical corners, upper edges and hand recesses of the container.

Other objects will appear and be more fully pointed out in the following specification and claims.

Referring to the accompanying drawing which illustrates the best form of my device at present known to me:

Figure 1 is a plan view of a battery container with a pair of my improved handles attached thereto;

Fig. 2 is a fragmentary end view of the container and handle;

Fig. 3 is a fragmentary section taken on the line 3—3 of Fig. 2, and

Fig. 4 is an end view showing the container with the integral handle or hand recesses only.

The container illustrated is of the common molded type, usually constructed from rubber or asphaltic composition. It has side walls 5, end walls 6 and partitions 7. The upper portions of the end walls 6 and corners are reinforced by increased thicknesses of material and near each corner there is a vertically extending shoulder 8 adapted to be engaged by members of the auxiliary handles hereinafter described. The reinforced end walls have handle recesses 9 formed therein as an integral part of the container.

A pair of auxiliary handles are formed to detachably engage the end walls and vertical corners of the container. A band of sheet metal 10, of suitable thickness and strength, extends entirely across each end wall on the outer surface of the same and integral arms 11, projecting from the ends of the band 10, embrace the outer surfaces of the side walls 5 and have their extremities 12 offset to positively engage the shoulders 8 formed on the container. A pair of integral fingers 13 project from the upper edge of each band 10 in engagement with the upper surface of the end wall 6 and the inner extremities 14 of the fingers are bent down to positively engage the inner surface of the wall.

Cut from the band 10 and projecting obliquely into the handle recesses 9 is a pair of tongues 15 adapted to be sprung into said openings 9 when the metal handle is applied; these tongues being attached at their lower extremities to the band 10 and having their upper extremities free for movement to and from the recesses 9. Rigid, upstanding projections 16 on the band 10 have their upper ends connected by horizontal grips 17 which are integral with the projections. Each grip 17 is formed by rolling a cylindrical bead in the integral sheet of metal from which the entire auxiliary handle is cut.

The auxiliary handles are die stamped or otherwise shaped from sheet metal of sufficient thickness and strength to withstand the strains which may be imposed on them in the usual course of service and such sheet metal is preferably coated or plated with a resistant metal or composition adapted to withstand the action of the elements and of the acid used in the batteries.

The auxiliary handles may be applied to the containers either before or after the battery plates or cells are installed in the containers. It will be understood that the auxiliary handle is merely pressed downward from the top of the container with the extremities 12 of the arms 11 in engagement with the shoulders 8 and with the band 10 upon the outer surface of the end wall 6. During the downward movement, the tongues 15 are sprung outward and as they reach a position in registry with the recess 9 they spring into the recess. The sheet metal has sufficient resiliency to permit the necessary bending and to restore the parts to their original form when in place. Downward movement is stopped by the fingers 13 which engage the upper edge of the wall 6 as the tongues 15 spring into the recess 9.

The handle is rendered unusually strong by my arrangement of the arms 11 (embracing the opposite side walls 5 and shoulders 8) which coact with the fingers 13 (engaging the upper and inner surfaces of the end walls) and with the tongues 15 (engaging in the recesses 9) to strongly brace the handles against movement in any direction relative to the container. If it becomes necessary to remove the auxiliary handles, a tool may be inserted centrally between the band 10 and wall 6 with sufficient force to spring the band 10 and withdraw the tongues 15 from the recesses 9. This may be accomplished without damage to the container or handles.

The extremities 14 of the fingers 13 are covered and protected by the cement or composition which is customarily used as a seal for the assembled battery. The auxiliary handles are preferably formed before attaching to the container and no shaping is necessary after they have been put in place to make them fast on the container.

My invention makes it possible for the battery manufacturer and wholesale and retail dealers to carry in stock batteries having handles built into the containers of one type only, together with the auxiliary handles which may be readily installed on these batteries when it is desired to adapt them to such types of service as require raised handles. This effects a substantial saving in the costs and convenience of maintaining stocks of batteries to meet all requirements. The invention also makes it possible for the ultimate consumer or owner of the battery to adapt the battery, by means of the auxiliary handles, to different types of service. Thus, at small expense, a battery without projecting handles may be altered for service requiring projecting handles or a battery with the auxiliary handles may have them removed for service requiring the absence of projections. In providing the above-mentioned savings and advantages to the dealers, manufacturers and users of the batteries, the invention does not sacrifice any of the features of simplicity and strength obtainable with the different types of battery containers and handles in common use.

Having described my invention, what I claim as new and desire to protect by Letters Patent is:

1. A handle for a battery container having side walls and an end wall formed with a handle recess, comprising a sheet metal band spanning said end wall and engaging the outer surfaces of said side walls, a resilient tongue projecting obliquely upward from said band into said recess to confine said band against upward movement relative to said container, said tongue being arranged to be sprung substantially into the plane of said band to permit the downward application of the handle to said container, and means projecting from said band and engaging the upper edge of said end wall to limit downward movement of said band relative to the container.

2. An auxiliary handle for a battery container having side walls and an end wall, said end wall being formed with a handle recess, comprising a sheet metal band spanning said end wall and engaging said side walls, a resilient tongue normally projecting obliquely upward from said band into said recess to confine said handle against upward withdrawal, said tongue being arranged to be sprung substantially into the plane of said band to permit the downward application of the handle to said container and a pair of fingers projecting from said handle in engagement with the upper edge of said end wall to limit downward movement of said auxiliary handle relative to the container, said fingers having their inner extremities offset downward to engage the inner surface of said end wall.

CARL G. REETZ.